July 1, 1958 L. C. PACE Re. 24,495

CONTAINER FOR SHOES AND THE LIKE

Original Filed Feb. 28, 1955

LEO C. PACE,
INVENTOR.

BY Eaton + Bell
ATTORNEYS

United States Patent Office

Re. 24,495

Reissued July 1, 1958

24,495

CONTAINER FOR SHOES AND THE LIKE

Leo C. Pace, Asheville, N. C.

Original No. 2,772,045, dated November 27, 1956, Serial No. 491,021, February 28, 1955. Application for reissue January 27, 1958, Serial No. 711,535

9 Claims. (Cl. 229—52)

Matter enclosed in heavy brackets [ ] appears in the original patent but forms no part of this reissue specification; matter printed in italics indicates the additions made by reissue.

This invention relates to portable containers, particularly of the type for packaging and transporting wearing apparel, such as shoes and the like, and it is an object of this invention to provide an improved container or box and handle means therefor wherein a cover is provided for the box, which cover has relatively wide side walls which encompass substantially half of the side walls of the body of the box when in closed position. Opposed ends of a carrying cord are connected to opposite side walls of the box and extend outwardly through holes formed in opposite side walls of the cover at points spaced from one end of the box to form the cord into a loop so that, when the cord is drawn taut, such as when carrying the container or box, the opposed runs or reaches of the cord tend to hold the cover in snug engagement with the box. On the other hand, the cover may easily be opened relative to the box by moving the cover so that opposite walls thereof move relative to the cord as the cover is swung to open position.

Some of the objects of the invention having been stated, other objects will appear as the description proceeds when taken in connection with the accompanying drawings, in which—

Figure 1:
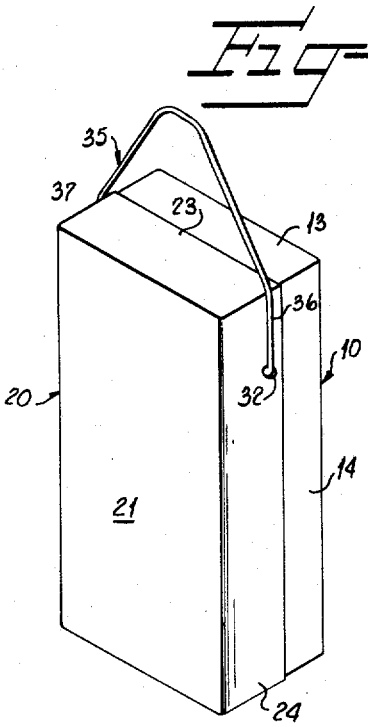
Figure 1 is an isometric view of the improved container or box showing the cover in closed position ready for carrying.

Referring more specifically to the drawings, the substantially rectangular body of the container is broadly designated at 10 and includes a bottom wall 11, opposite end walls 12, 13 and spaced side walls 14, 15 which may be made from paper, cardboard, plastic or any other desired material and which may be interconnected in any desired manner. The cover for the body of the container is broadly designated at 20 and includes a top or outer wall 21, longitudinally spaced end walls 22, 23 and laterally spaced side walls 24, 25. Of course, the end walls 22, 23 and side walls 24, 25 are spaced so they will fit snugly about the end walls 12, 13 and side walls 14, 15 of the body 10. Unlike the usual shoe box, the end walls 22, 23 and side walls 24, 25 of the cover 20 are substantially one-half the width or greater than one-half the width of the end walls 12, 13 and side walls 14, 15 of the body 10.

The side walls 14, 15 of the body 10 have respective apertures or eyelets 30, 31 therein which are preferably disposed at a point approximately half the distance between the bottom wall 11 and the free edges of the respective side walls 14, 15 and which are spaced from the end wall 13 a distance less than half the length of the side walls 14, 15. A spacing distance from the end wall 13 equal to approximately one-fourth of the length of the side walls 14, 15 of the body 10 is preferred.

Figure 3:
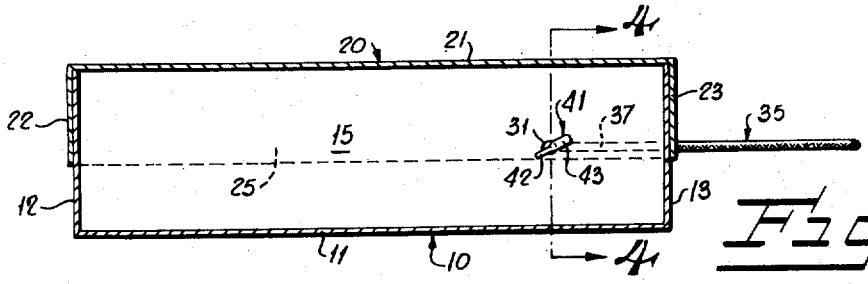
Figure 3 is a longitdinal sectional view through the box or container showing the cover in closed position.
Figure 4:
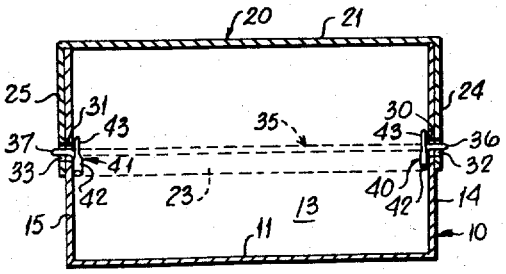
Figure 4 is a transverse sectional view through the box or container taken substantially along line 4—4 in Figure 3 and showing, in particular, how the cord or string is attached to the side walls of the box and loosely extends through the contiguous side walls of the cover.

Now, the side walls 24, 25 of the cover 20 also have relatively small holes or eyelets 32, 33 therein which preferably coincide with the respective holes 30, 31 when the cover 20 is in closed position as shown in Figures 3 and 4. A pliable carrying handle, cord or string 35 is provided, which is looped to form opposite runs or reaches 36, 37 which straddle corresponding end portions of the side walls 24, 25 of the cover 20. The cord 35 loosely extends through the holes 32, 33 in said side walls 24, 25 and also loosely extends through the holes 30, 31 in the side walls 14, 15 of the body 10. Any suitable restraining means 40, 41 may be provided on the free ends of the cord 35, to prevent egress of opposite ends of the cord 35 from the holes, apertures or eyelets 30, 31 in the respective side walls 14, 15 of the body 10 of the container.

In this instance, each of said restraining means is in the form of an elongated element having a rounded portion 42 which is clampingly secured about the corresponding end of the cord 35 and which has a flat extension 43 thereon, both portions 42, 43 of each of the restraining elements 40, 41 being of such size that they may readily be inserted through the holes 30, 31, 32 and 33 in the side walls of the body and the cover, but being of such length that they will project beyond the diametrically opposed wall portions of the apertures, eyelets or openings 30, 31 to prevent opposite ends of the cord 35 from slipping out of the holes 30, 31 in the side walls 14, 15 of the body 10 of the container.

Figure 2:
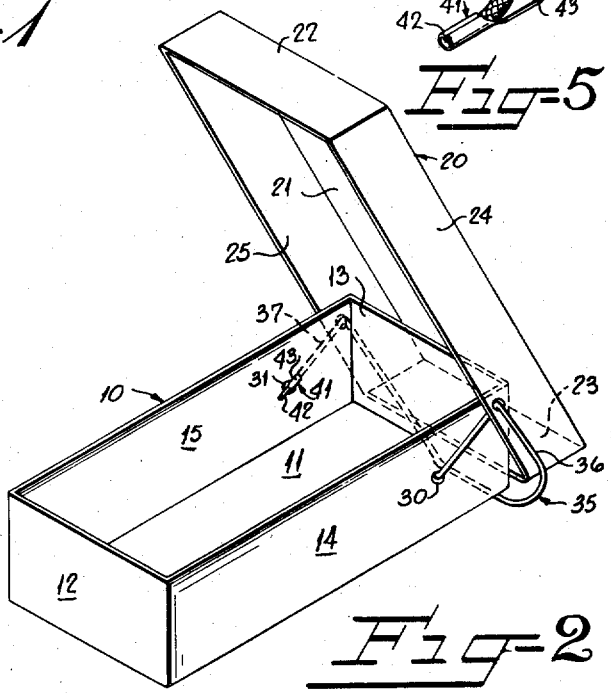
Figure 2 is another isometric view of the box showing the cover in open position.
Figure 5:
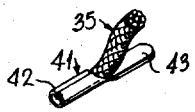
Figure 5 is an isometric view of the cord attaching means.

It is thus seen that, when the cover 20 is in closed position as shown in Figures 1, 3 and 4, the greater the pressure that is exerted on the handle or cord 35 by the user due to the weight of the contents of the container, the greater will be the locking effect of the reaches 36, 37 of the cord or handle 35 so the cover 20 will remain locked on the body 10 when the container is carried by the handle or cord 35. On the other hand, when opposed reaches 36, 37 of the pliable handle or cord 35 are relaxed, it is apparent by referring to Figure 2 that the cover 20 may easily be opened relative to the body 10 as the eyelets or holes 32, 33 in side walls 24, 25 of the cover 20 are moved along the respective reaches 36, 37 of the pliable handle or cord 35 with downward and outward movement of the end wall 23 relative to the body 10 and as the other end of the cover 20 is swung away from the corresponding end of the body 10.

It is thus seen that I have provided a container which is particularly adapted for containing a pair of shoes therein wherein a pliable handle is provided on the container which will not interfere with the opening and closing of the cover of the container thus obviating the necessity of providing a separate container, as has heretofore been required, in which the usual type of shoe box is placed for carrying purposes.

In the drawing and specification there has been set forth a preferred embodiment of the invention and, although specific terms are employed, they are used in a generic and descriptive sense only and not for purposes of limitation, the scope of the invention being defined in the claims.

I claim:

1. A container comprising a substantially rectangular body provided with a bottom, first and second side walls and first and second end walls, a cover for said body comprising a top wall, third and fourth side walls and third and fourth end walls, said end walls and side walls of the cover being substantially one-half the width of the end walls and side walls of said body and being adapted to fit snugly about the corresponding walls of said body, said first and third side walls and said second and fourth side walls having respective coinciding eyelets therethrough when the container is closed located at points substantially half-way between the bottom wall of the body and the opposite edges of the first and second side walls and also being located adjacent said first end wall, a double-ended pliable handle formed into a loop and having opposed ends thereof projecting inwardly through the eyelets in the third and fourth side walls and through the eyelets in the first and second side walls, and means restraining the free ends of the pliable handle from being pulled out of said eyelets.

2. A container comprising a substantially rectangular body provided with a bottom, first and second side walls and first and second end walls, a cover for said body comprising a top wall, third and fourth side walls and third and fourth end walls, said end walls and side walls of the cover being substantially one-half the width of the end walls and side walls of said body and being adapted to fit snugly about the corresponding walls of said body, said first and third side walls and said second and fourth side walls having respective coinciding eyelets therethrough when the container is closed located at points substantially half-way between the bottom wall of the body and the free edges of the first and second side walls, a double-ended pliable handle formed into a loop and having opposed ends thereof projecting inwardly through the eyelets in the third and fourth side walls and through the eyelets in the first and second side walls, and means restraining the free ends of the pliable handle from being pulled out of the eyelets in the first and second side walls.

3. An elongated substantially rectangular container comprising a body having a bottom wall, spaced first and second end walls and spaced first and second side walls, a cover having a top wall, spaced third and fourth end walls and spaced third and fourth side walls, said third and fourth end walls and third and fourth side walls adapted to fit snugly against the outer surfaces of the respective first and second end walls and first and second side walls, said first and second side walls having substantially axially alined relatively small first and second holes therein spaced from said first end wall a distance less than one-half of the total length of the first and second side walls and also being located at points substantially midway of the width of the first and second side walls, said third and fourth side walls also having respective third and fourth relatively small holes therein coinciding with the first and second holes when the cover is in closed position, a cord handle having first and second ends thereon, said first end being inserted through said third and first holes and said second end being inserted through said fourth and second holes, separate means on said ends to prevent egress of said cord from said holes but permitting free movement of said cord therein, whereby the cover may be swung to open position relative to the body by moving the fourth end wall on said cover away from the second end wall on said body while moving the side walls of the cover relative to the side walls of the body and passing the cord through the third and fourth holes in the respective third and fourth side walls of the cover.

4. A container as claimed in claim 3 wherein said end walls and side walls of the cover are substantially one-half of the width of the end walls and side walls of said body.

5. An elongated substantially rectangular container comprising a body having a bottom wall, spaced first and second end walls and spaced first and second side walls, a cover having a top wall, spaced third and fourth end walls and spaced third and fourth side walls, said third and fourth end walls and third and fourth side walls adapted to fit snugly against the outer surfaces of the respective first and second end walls and first and second side walls, said first and second side walls having substantially axially alined relatively small first and second holes therein spaced from said first end wall substantially a distance of approximately one-fourth of the total length of the first and second side walls and also being located at points substantially midway of the width of the first and second side walls, said third and fourth side walls also having respective third and fourth relatively small holes therein coinciding with the *first and* second [and third] holes when the cover is in closed position, a cord handle having first and second ends thereon, said first end being inserted through said third and first holes and said second end being inserted through said fourth and second holes, separate means on said ends to prevent egress of said cord from said holes but permitting free movement of said cord therein each comprising an elongated element having a rounded portion which is clampingly secured about each cord end and which element has a flat extension thereon.

6. An elongated substantially rectangular container comprising a body having a bottom wall, spaced first and second end walls and spaced first and second side walls, a cover having a top wall, spaced third and fourth end walls and spaced third and fourth side walls, said third and fourth end walls and third and fourth side walls being adapted to fit snugly against the outer surfaces of the respective first and second end walls and first and second side walls, said first and second side walls having substantially axially alined relatively small first and second holes therein spaced from said first end wall a distance less than one-half of the total length of the first and second side walls and also being located at points substantially midway of the width of the first and second side walls, said third and fourth side walls also having respective third and fourth relatively small holes therein located adjacent the *first and* second [and third] holes when the cover is in closed position, a cord handle having first and second ends thereon, said first end being inserted inwardly through said third and first holes and said second end being inserted inwardly through said fourth and second holes, and separate means on said ends to prevent egress of said cord from said holes but permitting free movement of said cord therein, whereby the cover may be swung to open position relative to the body by moving the fourth end wall on said cover away from the second end wall on said body while moving the side walls of the cover relative to the side walls of the body and passing the cord through the third and fourth holes in the respective third and fourth side walls of the cover.

*7. An elongated substantially rectangular container comprising a body having a bottom wall, spaced first and second end walls and spaced first and second side walls, a cover having a top wall, spaced third and fourth end walls and spaced third and fourth side walls, said third and fourth end walls and third and fourth side walls being adapted to surround the outer surfaces of the respective first and second end walls and first and second side walls, said first and second side walls having relatively small first and second holes therein spaced from said first end wall a distance less than one-half of the length of each of the first and second side walls and also being located at points between the upper and lower edges of the first and second side walls, said third and fourth side walls also having respective third and fourth relatively small holes therein, a cord handle having first and second ends thereon, said first end being inserted inwardly through said third and first holes and said second end being inserted inwardly through said fourth and second holes, means to prevent egress of said cord ends through said holes, the remaining portion of the cord extending outwardly from the third and fourth side walls in the form of a handle loop, said side walls*

*of the cover being of such width and the holes therein being so disposed that the cover becomes locked upon the body when the cord is tensioned by carrying the container with the looped portion of the cord and the cover is readily opened when tension in the looped portion of the cord is relaxed.*

*8. An elongated substantially rectangular container comprising a body having a bottom wall, spaced first and second end walls and spaced first and second side walls, a cover having a top wall, spaced third and fourth end walls and spaced third and fourth side walls, said third and fourth end walls and third and fourth side walls being adapted to surround the outer surfaces of the upper portions of the respective first and second end walls and first and second side walls, said first and second side walls having relatively small first and second holes therein spaced from said first end wall a distance less than one-half of the length of each of the first and second side walls and also being located at points intermediate the width of the first and second side walls, said third and fourth side walls also having respective third and fourth relatively small holes therein located adjacent the first and second holes when the cover is in closed position, a cord handle having first and second ends thereon, said first end being inserted inwardly through said third and first holes and said second end being inserted inwardly through said fourth and second holes, means on said cord ends to restrain the cord from being pulled out of the holes, the remaining portion of the cord extending outwardly from the third and fourth side walls in the form of a handle loop, said side walls of the cover being of such width and the holes therein being so disposed that the cover becomes locked upon the body when the cord is tensioned by carrying the container with the looped portion of the cord and the cover is readily opened when tension in the looped portion of the cord is relaxed.*

*9. An elongated substantially rectangular container comprising a body having a bottom wall, spaced first and second end walls and spaced first and second side walls, a cover having a top wall, spaced third and fourth end walls and spaced third and fourth side walls, said third and fourth end walls and third and fourth side walls being adapted to surround the outer surfaces of the respective first and second end walls and first and second side walls, said first and second side walls having first and second holes therein spaced inwardly from said first end wall and being located at points between the upper and lower edges of the first and second side walls, said third and fourth side walls also having respective third and fourth holes therein, a pliable handle having first and second ends thereon, said first end being inserted through said third and first holes and said second end being inserted through said fourth and second holes, means to prevent egress of said handle ends through said holes, the remaining portion of the handle extending outwardly from the third and fourth side walls, said side walls of the cover being of such width and the holes therein being so disposed that the cover becomes locked upon the body when the handle is tensioned by carrying the container therewith and the cover is readily opened when tension in the handle is relaxed.*

References Cited in the file of this patent or the original patent

UNITED STATES PATENTS

| | | |
|---|---|---|
| 241,525 | Buchingham | May 17, 1881 |
| 1,083,403 | Joslin | Jan. 6, 1914 |
| 1,771,766 | Berney | July 29, 1930 |